(12) United States Patent
Paik et al.

(10) Patent No.: US 7,532,273 B2
(45) Date of Patent: May 12, 2009

(54) LIQUID CRYSTAL DISPLAY DEVICE

(75) Inventors: Sang-Yoon Paik, Seoul (KR);
Su-Woong Lee, Gyeongsangbukdo (KR); Seung-Jin Hong, Seoul (KR)

(73) Assignee: LG Display Co., Ltd., Seoul (KR)

( * ) Notice: Subject to any disclaimer, the term of this patent is extended or adjusted under 35 U.S.C. 154(b) by 627 days.

(21) Appl. No.: 11/117,543

(22) Filed: Apr. 29, 2005

(65) Prior Publication Data

US 2005/0253982 A1    Nov. 17, 2005

(30) Foreign Application Priority Data

May 14, 2004    (KR) .................. 10-2004-0034105

(51) Int. Cl.
*G02F 1/1335* (2006.01)
*G02F 1/1333* (2006.01)

(52) U.S. Cl. .......................... 349/96; 349/40

(58) Field of Classification Search ............... 349/13, 349/16, 58, 96–98, 112, 40, 122; 359/613–614
See application file for complete search history.

(56) References Cited

U.S. PATENT DOCUMENTS

| 6,552,761 | B1 * | 4/2003 | Seo et al. ............... 349/58 |
| 6,908,647 | B2 * | 6/2005 | Obayashi et al. ......... 428/1.32 |
| 2003/0202137 | A1 * | 10/2003 | Nakamura et al. ........ 349/96 |
| 2005/0142304 | A1 * | 6/2005 | Kawanishi et al. ........ 428/1.31 |

* cited by examiner

*Primary Examiner*—Dung T. Nguyen
(74) *Attorney, Agent, or Firm*—McKenna Long & Aldridge LLP.

(57) ABSTRACT

A liquid crystal display device includes first and second substrates facing each other and having a pixel region; a liquid crystal layer between the first and second substrates; a first polarizer on an outer surface of the second substrate; and a friction reducing layer on an outer surface of the first polarizer.

23 Claims, 7 Drawing Sheets

LIQUID CRYSTAL DISPLAY DEVICE

The present invention claims the benefit of Korean Patent Application No. 2004-0034105, filed in Korea on May 14, 2004, which is hereby incorporated by reference.

BACKGROUND OF THE INVENTION

1. Field of the Invention

The present invention relates to a liquid crystal display device, and more particularly, to a liquid crystal display (LCD) device having a friction reducing layer. Although the present invention is suitable for a wide scope of applications, it is particularly suitable for improving display quality.

2. Discussion of the Related Art

Until recently, display devices have generally used a cathode-ray tube (CRT). Presently, many efforts are being made to study and develop various types of flat panel displays, such as a liquid crystal display (LCD) device, a plasma display panel (PDP), a field emission display (FED), and an electroluminescence display (ELD), as a substitute for CRTs. Of these flat panel displays, the LCD device has many advantages, such as high resolution, light weight, thin profile, compact size, and low voltage power supply requirements.

In general, an LCD device includes two substrates that are spaced apart and face each other with a liquid crystal material interposed between the two substrates. The two substrates include electrodes that face each other such that a voltage applied between the electrodes induces an electric field across the liquid crystal material. Alignment of the liquid crystal molecules in the liquid crystal material changes in accordance with the intensity of the induced electric field into the direction of the induced electric field, thereby changing the light transmissivity of the LCD device. Thus, the LCD device displays images by varying the intensity of the induced electric field.

FIG. 1 is a perspective view of an LCD device according to the related art.

As shown in FIG. 1, the LCD device 11 includes an upper substrate 5, a lower substrate 22 and a liquid crystal layer 14. The upper substrate 5 is often referred to as a color filter substrate that includes a color filter pattern 8, a black matrix 6 between the color filter patterns 8, and a common electrode 18 on both the color filter pattern 8 and the black matrix 6. The lower substrate 22 is often referred to as an array substrate that includes a data line 15 and a gate line 13 that cross each other and define a pixel region P. A pixel electrode 17 and a thin film transistor T as a switching element are positioned in each pixel region P. Thin film transistors T, which are disposed adjacent to where the data lines 15 and the gate lines 13 cross, are disposed in a matrix form on the lower substrate 22. The gate line 13 and a storage electrode 30 overlapping the gate line 13 define a storage capacitor C.

Though not shown in FIG. 1, upper and lower polarizers are disposed on outer surfaces of the upper and lower substrates 5 and 22, respectively. The polarizer transmits a component of light according to an optical axis of the polarizer. Accordingly, depending upon arrangement of the optical axes of the upper and lower polarizer, the LCD device 11 transmits or shuts light, thereby displaying images.

FIG. 2 is a cross-sectional view of a polarizer for the LCD device according to the related art.

As shown in FIG. 2, the polarizer 100 includes a polarizing layer 130 having an optical axis, first and second protecting layers 120 and 140 on lower and upper surfaces of the polarizing layer 130, respectively. Further, an adhesive layer 110 is disposed on a lower surface of the first protecting layer 120, and a protection film 150 is disposed on an upper surface of the second protecting layer 140.

The polarizing layer 130 transmits a light component according with the axis of the polarizing layer 130, and the first and second protecting layer 120 and 140 protect the polarizing layer 130. The polarizer 100 is attached to each upper and lower substrates 5 and 22 by the adhesive layer 110 (shown in FIG. 1). The protection film 150 protects the polarizer 100 from the outer environment, and is removed after attaching the polarizer 100 to each of the substrate.

After attaching polarizer 100 to each of the substrates, an outer case (not shown) is attached to the LCD device. In particular, the outer case covers side portions and lower portions of the LCD device, and thus an upper portion of the LCD device, which is the second protecting layer 140, is exposed.

Since the upper surface (i.e., the exposed surface of the second protection layer 140) is rough, a friction force is generated when the upper surface of the second protection layer 140 contacts an exterior object, for example, a finger. The friction force causes an abnormal variation of liquid crystal arrangement, and thus a light luminance is changed. In particular, when the LCD device is operated in a Normally Black Mode, a light leakage can be generated due to the friction force. Therefore, display quality can be degraded.

SUMMARY OF THE INVENTION

Accordingly, the present invention is directed to a liquid crystal display device that substantially obviates one or more of problems due to limitations and disadvantages of the related art.

An object of the present invention is to provide a liquid crystal display device that improves a display quality.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes first and second substrates facing each other and having a pixel region; a liquid crystal layer between the first and second substrates; a first polarizer on an outer surface of the second substrate; and a friction reducing layer on an outer surface of the first polarizer.

In another aspect, a liquid crystal display device includes a liquid crystal panel having first and second substrates facing each other, and a liquid crystal layer between the first and second substrates; a first polarizer on an upper surface of the liquid crystal panel; a friction reducing layer on an outer surface of the first polarizing layer; and an outer case covering side portions and a lower surface of the liquid crystal panel.

In yet another aspect, a display device includes a display panel; a first polarizer on an upper surface of the display panel; a friction reducing layer on an outer surface of the first polarizing layer; and an outer case covering side portions and a lower surface of the display panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the illustrated embodiments of the present invention, which are illustrated in the accompanying drawings.

Figure 1:
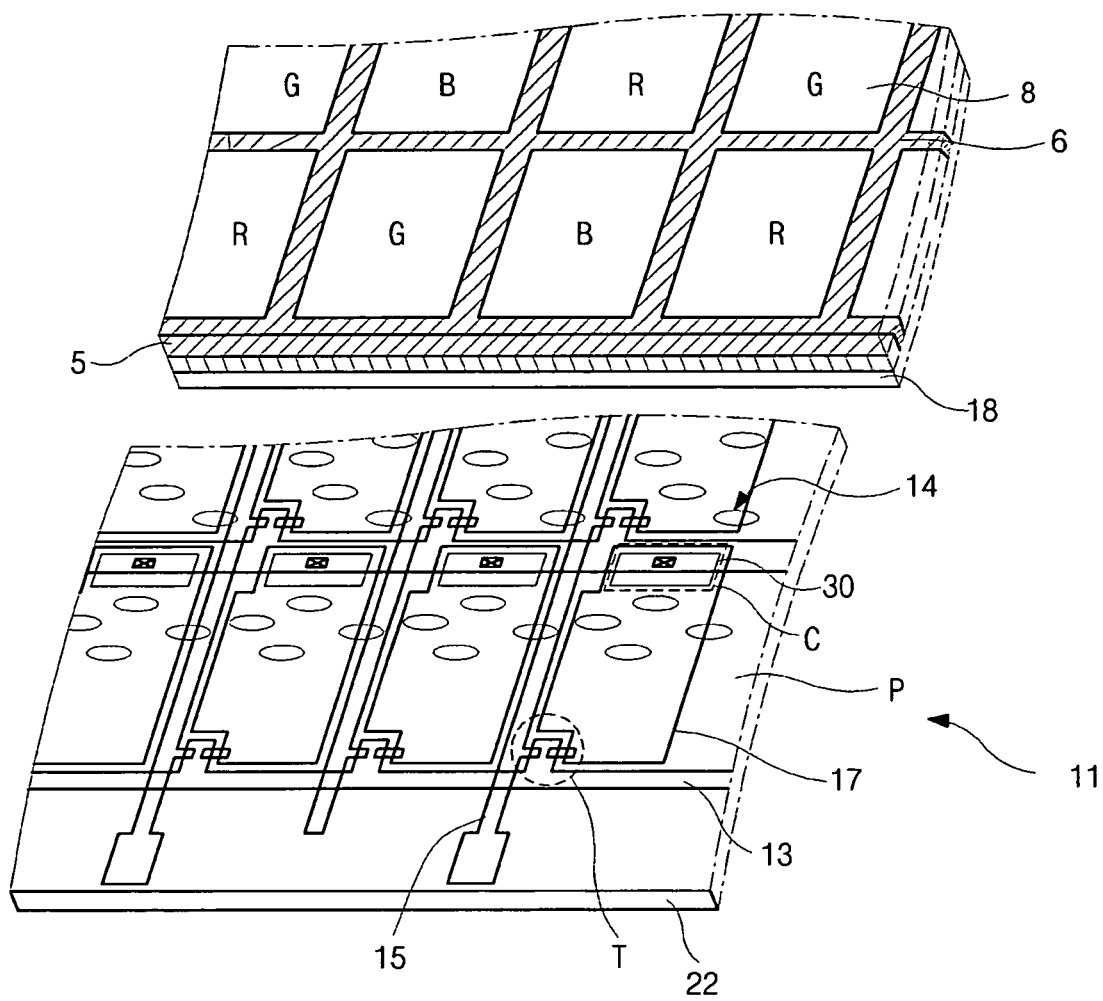
FIG. 1 is a perspective view of an LCD device according to the related art.
Figure 2:
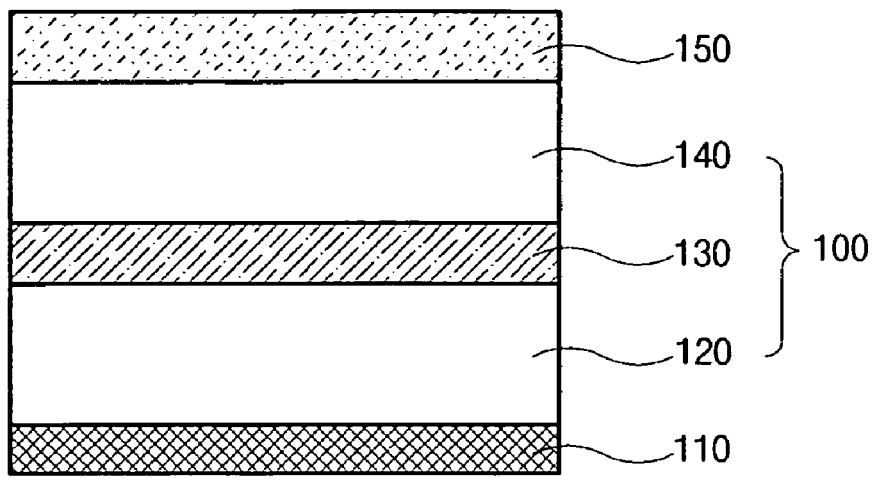
FIG. 2 is a cross-sectional view of a polarizer for the LCD device according to the related art.
Figure 3:
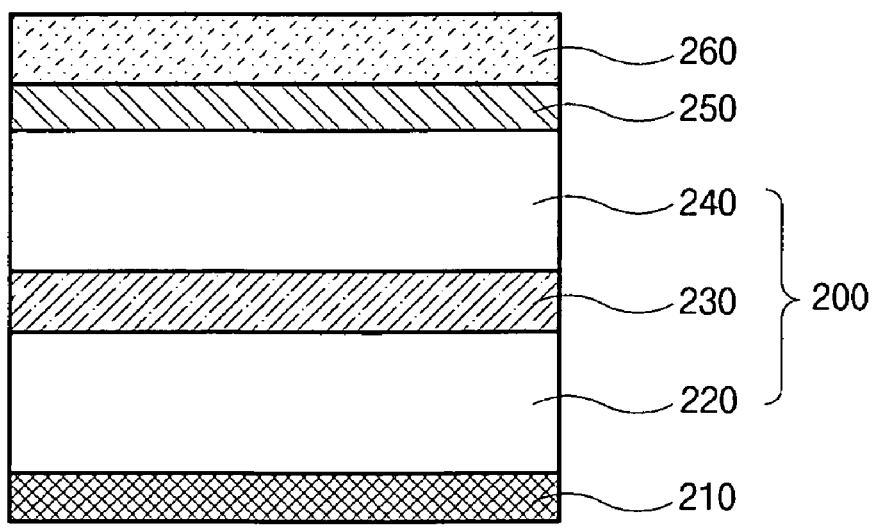
FIG. 3 is a cross-sectional view of a polarizer and a friction reducing layer for an LCD device according to the present invention.
Figure 3:
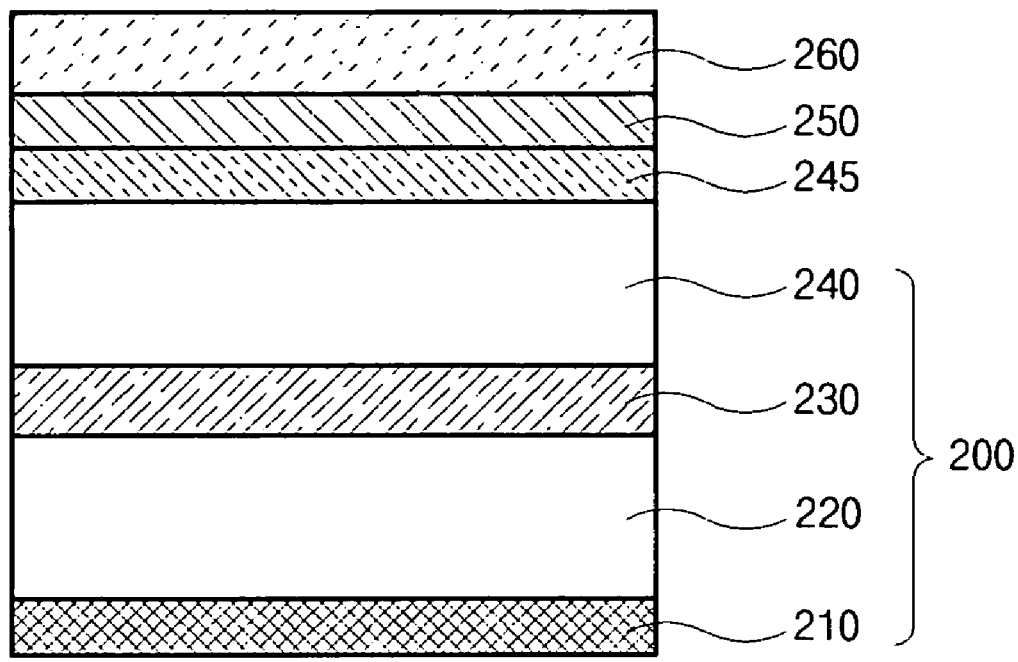

FIG. 3 is a cross-sectional view of a polarizer and a friction reducing layer for an LCD device according to the present invention.

As shown in FIG. 3, a polarizer 200 includes a polarizing layer 230, first and second protecting layers 220 and 240 on lower and upper surfaces (or inner and outer surfaces) of the polarizing layer 230. Further, an adhesive layer 210 on a lower surface (or inner surface) of the first protecting layer 220, a friction reducing layer 250 on an upper surface (or outer surface) of the second protecting layer 240, and a third protection film 260 on an upper surface (or outer surface) of the friction reducing layer 250. A compensation layer 245 compensating a light phase difference may be disposed between the friction reducing layer 250 and the second protecting layer 240.

The polarizing layer 230 has an optical axis such that it transmits a light component according with the axis of the polarizing layer 230. The polarizing layer 230 may be made of poly vinyl alcohol (PVA).

The first and second protecting layers 220 and 240 protect the polarizing layer 230. The first and second protection layer 220 and 240 may be made of one of tri-acetate cellulose (TAC), poly carbonate (PC), arton, and liquid crystal.

The adhesive layer 210 is used to attach the polarizer 200 onto an upper substrate (not shown) of the LCD device.

The protection film 260 protects the polarizer 200 from an exterior environment during the period prior to attaching the polarizer 200 to the upper substrate, and is removed after attaching the polarizer 200 to the upper substrate.

The friction reducing layer 250 is used to reduce a friction force caused by any contact. When an outer object, for example, a finger contacts the friction reducing layer 250, a friction force is generated. Accordingly, to reduce such a friction force, the friction reducing layer 250 may have a smooth upper surface (or outer surface). In particular, the friction reducing layer 250 has a small friction coefficient. For example, the friction reducing layer 250 has a friction coefficient smaller than that of the second protecting layer 240. Further, when the compensation layer is disposed between the friction reducing layer 250 and the second protecting layer 240, the friction reducing layer 250 has a friction coefficient smaller than that of the compensation layer.

As above explained, the polarizer for the LCD device has a friction reducing layer to reduce a friction force caused by any contact. Accordingly, an abnormal arrangement of the liquid crystal molecules can be reduced, and thus an abnormal variation of a light luminance can be reduced. In particular, when the LCD device is operated in a Normally Black Mode, a light leakage by the friction force can be reduced. Therefore, display quality can be improved.

The friction reducing layer may be applied to an in-plain switching (IPS) mode LCD device. In other words, since the IPS mode LCD is operated by an in-plane electric field parallel to the surface of the substrate, arrangement of the liquid crystal layer can be easily changed by the friction force generated in parallel to the surface of the substrate.

Figure 4:
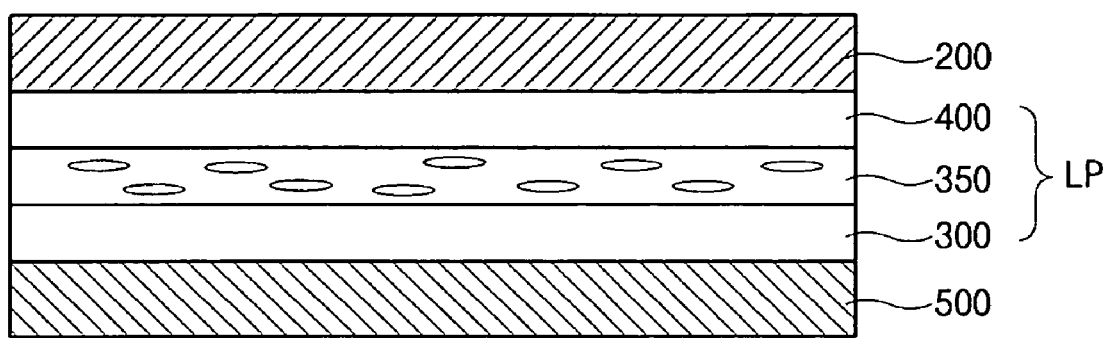
FIG. 4 is a cross-sectional view of an IPS mode LCD device according to the present invention.
Figure 5:
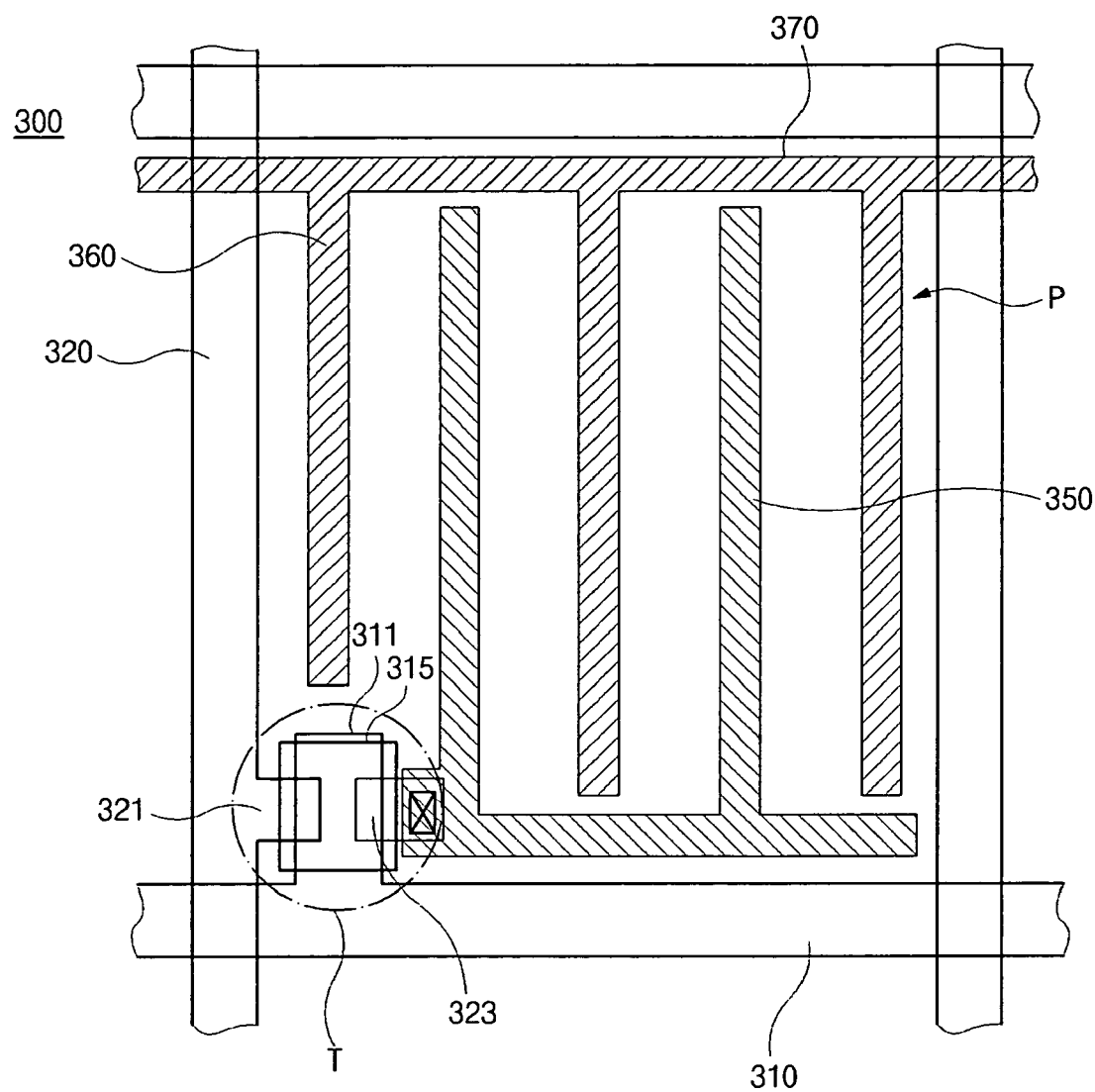
FIG. 5 is a plan view of a lower substrate of the LCD device shown in FIG. 4.
Figure 6:
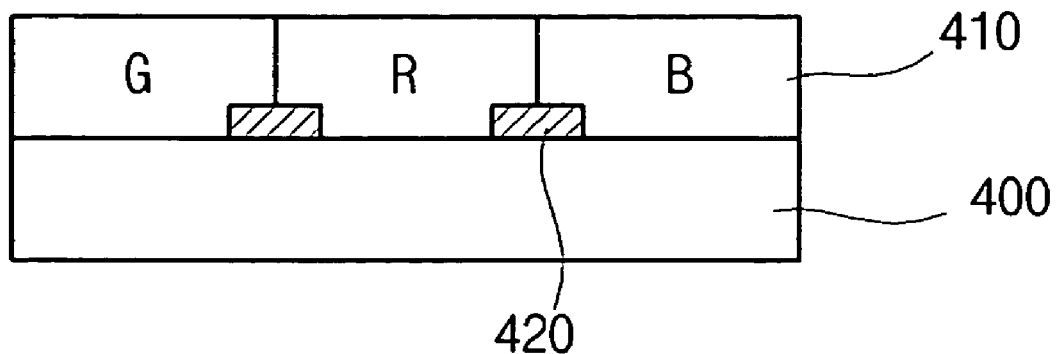
FIG. 6 is a cross-sectional view of an upper substrate of the LCD device shown in FIG. 4.
Figure 7:
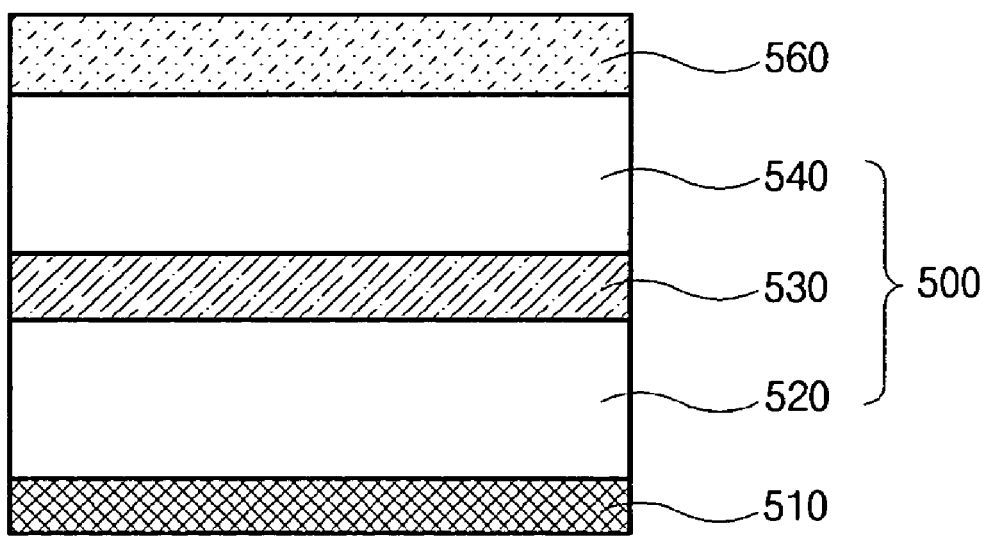
FIG. 7 is a cross-sectional view of a lower polarizer of the LCD device shown in FIG. 4.

FIG. 4 is a cross-sectional view of an IPS mode LCD device according to the present invention, FIG. 5 is a plan view of a lower substrate of the LCD device shown in FIG. 4, FIG. 6 is a cross-sectional view of an upper substrate of the LCD device shown in FIG. 4, and FIG. 7 is a cross-sectional view of a lower polarizer of the LCD device of FIG. 4.

As shown in FIGS. 4 to 7, a liquid crystal panel LP includes lower and upper substrates 300 and 400, a liquid crystal layer 350 interposed between the lower and upper substrates 300 and 400. Upper and lower polarizers 200 and 500 are disposed on outer surfaces of the upper and lower substrates 400 and 300, respectively.

More specifically, as shown in FIG. 5, the lower substrate 300 includes gate and data lines 310 and 320 crossing each other and defining a pixel region P, a thin film transistor T at a crossing portion of the data and gate lines 310 and 320. The thin film transistor T includes a gate electrode 311, a semiconductor pattern 315, and source and drain electrodes 321 and 323.

In the pixel region P, pixel and common electrodes 350 and 360 are alternately arranged. The pixel electrode 350 is connected to the thin film transistor T, and the common electrode 360 is connected to a common line 370 transferring a common voltage. An in-plane electric field is induced between the pixel and common electrodes 350 and 360.

As shown in FIG. 6, a color filter 410 and a black matrix 420 between adjacent color filters 410 are formed on the upper substrate 400. The color filter 410 corresponds to the pixel region P, and the black matrix corresponds to metal patterns such as the gate and data lines 310 and 320, and the thin film transistor T.

The upper polarizer 200 is the same as the polarizer shown in FIG. 3. Accordingly, the upper polarizer 200 is attached to the upper substrate 400 by using the adhesive layer 210 shown in FIG. 3.

The upper and lower polarizers 200 and 500 have similar structures. The lower polarizer 500 includes a lower polarizing layer 530, third and fourth protecting layers 520 and 540 on lower and upper surfaces (or inner and outer surfaces) of the lower polarizing layer 530. Further, a lower adhesive layer 510 is disposed on a lower surface (or inner surface) of the third protecting layer 520, and a lower protection film 560 is disposed on an upper surface (or outer surface) of the fourth protecting layer 540. Though not shown in FIG. 7, a compensation layer compensating a light phase difference may be disposed between the fourth protecting layer 540 and the lower protection film 560. The lower polarizer 500 is attached to the lower substrate 300 (shown in FIGS. 4 and 5) by using the lower adhesive layer 510, and then the lower protection film 560 is removed.

The friction reducing layer 250 of FIG. 3 may not be disposed on the outer surface of the lower polarizer 500. For example, after attaching the upper and lower polarizers 200 and 500, the module process is conducted such that side portions and a lower portion of the liquid crystal panel are covered by an outer case (not shown). Accordingly, since the lower polarizer 500 is covered by the outer case, the friction reducing layer 250 may not be required.

Figure 8:
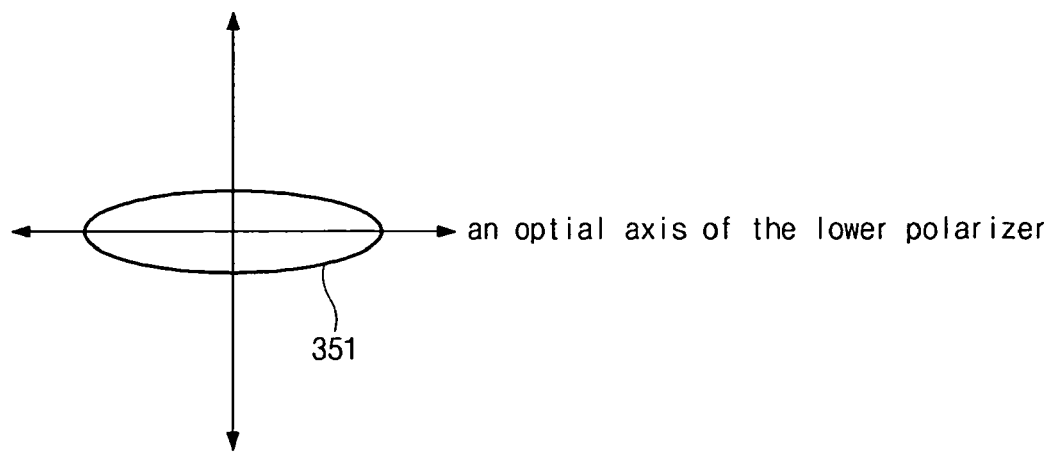
FIG. 8 illustrates a relationship between optical axes of upper and lower polarizers and a liquid crystal molecule of the LCD device according to the present invention.

FIG. 8 illustrates a relationship between optical axes of upper and lower polarizers and a liquid crystal molecule of the LCD device according to the present invention.

As shown in FIG. 8, an optical axis of the upper polarizer 200 (shown in FIG. 4) is perpendicular to that of the lower polarizer 500 (also shown in FIG. 4). An optical axis of the liquid crystal molecule 351 may accord with that of one of the upper and lower polarizers 200 and 500. For example, an optical axis (i.e., long axis) of the upper polarizer 200 is at an offset arrangement state of the liquid crystal molecule 351. When the above optical axis relationship is applied, the LCD device may be operated in a Normally Black mode that the LCD device is operated with a black state when an electric field is not induced to the liquid crystal molecule 351. On the other hands, the LCD device is operated with a white state when an electric field is induced to the liquid crystal molecule 351.

Figure 9:
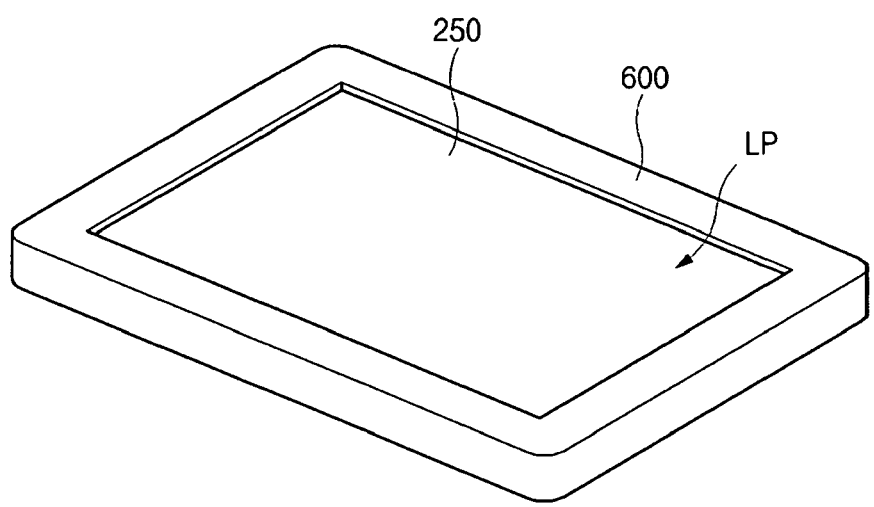
FIG. 9 is a schematic view of an LCD device with an outer case according to the present invention.

FIG. 9 is a view of an LCD device with an outer case according to the present invention.

As shown in FIG. 9, the outer case 600 covers side portions and a lower portion of a liquid crystal panel LP, and thus a friction reducing layer 250 on an upper portion of the liquid crystal panel LP is exposed. When the LCD device is operated in a Normally Black Mode, a friction force caused by contact with an exterior object can be reduced due to the friction reducing layer 250.

The present invention may be applied to not only the IPS mode LCD device, but also other mode LCD device, such as an LCD device where common and lower electrodes are disposed on upper and lower substrates, respectively, to induce an electric field perpendicular to a surface of the substrate. In particular, the present invention may be applied to an LCD device having a size greater than 40 inches. Further, The present invention may be applied to any types of display devices requiring a polarizer.

It will be apparent to those skilled in the art that various modifications and variations can be made in the LCD device of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
    first and second substrates facing each other and having a pixel region;
    a liquid crystal layer between the first and second substrates;
    a first polarizer on an outer surface of the second substrate; and
    a friction reducing layer on an outer surface of the first polarizer,
    wherein the friction reducing layer has a friction coefficient smaller than that of a top layer of the first polarizer contacting the friction reducing layer or that of a layer contacting the friction reducing layer and between the friction reducing layer and the first polarizer.

2. The device according to claim 1, wherein the first polarizer includes a polarizing layer, a first protecting layer between the polarizing layer and the second substrate, and a second protecting layer between the polarizing layer and the friction reducing layer.

3. The device according to claim 2, wherein the polarizing layer is made of poly vinyl alcohol.

4. The device according to claim 2, wherein the first and second protecting layers are made of one of tri-acetate cellulose, poly carbonate, arton and liquid crystal.

5. The device according to claim 2, wherein the friction reducing layer has a friction coefficient smaller than that of the second protecting layer contacting the friction reducing layer.

6. The device according to claim 1, further comprising a compensation layer between the friction reducing layer and the first polarizer.

7. The device according to claim 6, wherein the friction reducing layer has a friction coefficient smaller than that of the compensation layer contacting the friction reducing layer.

8. The device according to claim 1, further comprising a second polarizer on an outer surface of the first substrate.

9. The device according to claim 1, further comprising gate and data lines defining the pixel region, and pixel and common electrodes on an inner surface of the first substrate in the pixel region.

10. The device according to claim 1, further comprising a color filter pattern on an inner surface of the second substrate corresponding to the pixel region.

11. The device according to claim 1, further comprising an adhesive layer between the first polarizer and the second substrate.

12. A liquid crystal display device, comprising:
    a liquid crystal panel having first and second substrates facing each other, and a liquid crystal layer between the first and second substrates;
    a first polarizer on an upper surface of the liquid crystal panel; a friction reducing layer on an outer surface of the first polarizing layer; and
    an outer case covering side portions and a lower surface of the liquid crystal panel,
    wherein the friction reducing layer has a friction coefficient smaller than that of a top layer of the first polarizer contacting the friction reducing layer or that of a layer contacting the friction reducing layer and between the friction reducing layer and the first polarizer.

13. The device according to claim 12, wherein the first polarizer includes a polarizing layer, a first protecting layer between the polarizing layer and the liquid crystal panel, and a second protecting layer between the polarizing layer and the friction reducing layer.

14. The device according to claim 13, wherein the friction reducing layer has a friction coefficient smaller than that of the second protecting layer contacting the friction reducing layer.

15. The device according to claim 12, further comprising a compensation layer between the friction reducing layer and the first polarizer.

16. The device according to claim 15, wherein the friction reducing layer has a friction coefficient smaller than that of the compensation layer contacting the friction reducing layer.

17. The device according to claim 12, further comprising a second polarizer on the lower surface of the liquid crystal panel.

18. A display device, comprising:
a display panel;
a first polarizer on an upper surface of the display panel;
a friction reducing layer on an outer surface of the first polarizing layer; and
an outer case covering side portions and a lower surface of the display panel,
wherein the friction reducing layer has a friction coefficient smaller than that of a top layer of the first polarizer contacting the friction reducing layer or that of a layer contacting the friction reducing layer and between the friction reducing layer and the first polarizer.

19. The device according to claim 18, wherein the first polarizer includes a polarizing layer, a first protecting layer between the polarizing layer and the display panel, and a second protecting layer between the polarizing layer and the friction reducing layer.

20. The device according to claim 19, wherein the friction reducing layer has a friction coefficient smaller than that of the second protecting layer contacting the friction reducing layer.

21. The device according to claim 18, further comprising a compensation layer between the friction reducing layer and the first polarizer.

22. The device according to claim 21, wherein the friction reducing layer has a friction coefficient smaller than that of the compensation layer contacting the friction reducing layer.

23. The device according to claim 18, further comprising a second polarizer on the lower surface of the display panel.

* * * * *